3,041,137
PRODUCTION OF SODIUM PERBORATE TRIHYDRATE

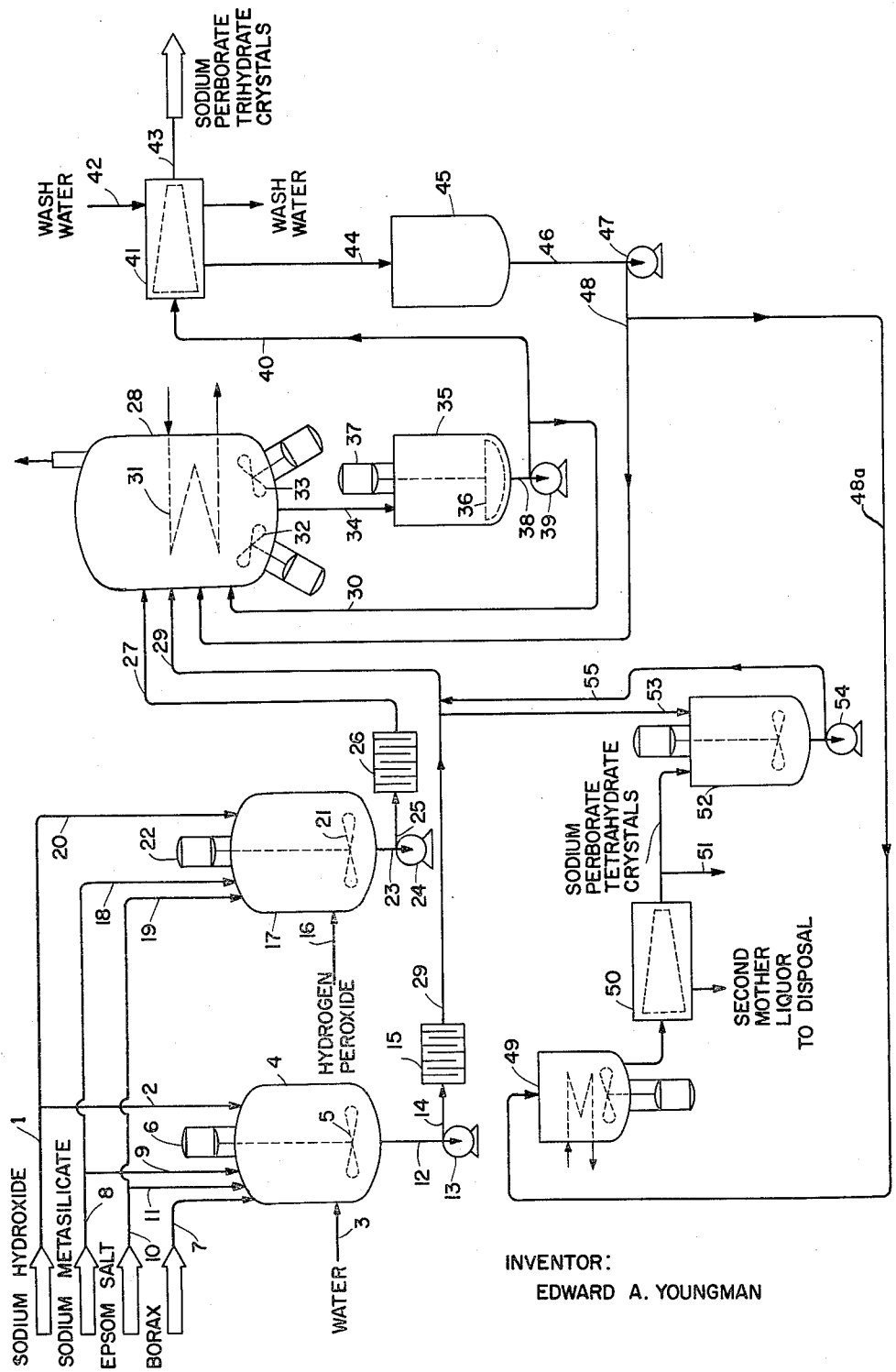

Edward A. Youngman, Lafayette, Calif., assignor to Shell Oil Company, a corporation of Delaware
Filed Sept. 21, 1956, Ser. No. 611,264
3 Claims. (Cl. 23—60)

This invention relates to an improved method for the production of the trihydrate form of sodium perborate represented by the formula $NABO_3 \cdot 3H_2O$ or $NaBO_2 \cdot H_2O_2 \cdot 2H_2O$. It deals with a method whereby this especially advantageous crystalline sodium perborate can be produced economically in consistent high yields and with markedly improved stability.

In copending application Serial No. 531,272, filed August 29, 1955, now patent No. 2,947,602, there has been described and claimed an advantageous method for producing sodium perborate trihydrate by reacting sodium borate with hydrogen peroxide in an aqueous medium under conditions at which sodium perborate crystallizes at temperatures within the range of 40° to 60° C. The trihydrate thus obtainable has marked advantages over the ordinary sodium perborate tetrahydrate in its stability and freedom from caking on exposure to the atmosphere. Some difficulty has been encountered, however, in obtaining consistent high yields of the trihydrate. It would also be highly desirable to still further improve the stability of this product, particularly to make it more stable during long periods of storage at moderate to high temperatures of the order of 37° C. or higher sometimes encountered in shipment and warehousing and/or use.

Attempts to obtain such stability by adding stabilizers to the sodium perborate trihydrated during or after manufacture have not been successful. Indeed, as pointed out in the copending application previously referred to, the presence of magnesium silicate in the reaction mixture seriously interferes with the crystallization of the desired trihydrate and leads to the formation of the faster crystallizing tetrahydrate. This is also true of other stabilizers which tend to be incompletely dissolved in the reaction mixture, and even the soluble stabilizers which do not interfere with the desired crystallization are not as effective as would be desirable. Addition of stabilizers to the crystalline sodium perborate trihydrate, likewise does not give the long term stability at higher temperatures which is one of the objects of the present invention.

It has been found that consistent high yields of sodium perborate trihydrate having outstanding storage stability can be obtained by carrying out the manufacture of this trihydrate in a plurality of cooperating steps. These steps comprise (1) suspending a gelatinous inorganic precipitate in an aqueous solution of sodium borate, (2) removing the gelatinous material from the solution, and (3) reacting the sodium borate solution with hydrogen peroxide to form sodium perborate trihydrate.

A particularly advantageous method of carrying out this new process comprises precipitating gelatinous magnesium silicate in an aqueous solution of sodium borate and filtering the solution before reacting with hydrogen peroxide to form the sodium perborate trihydrate. It was quite unexpected to find that this method of operation, incorporating as it does dissolved magnesium silicate in the reaction mixture, gives improved results, since, as pointed out above, magnesium silicate has been found to be an undesirable component of the reaction mixture when introduced directly into the mixture in amounts normally used for hydrogen peroxide stabilization. But contrary to what would have been predicted it has been discovered that by this modification of the invention of my previously mentioned copending application not only is the crystallization of the sodium perborate in the desirable trihydrate form not interfered with but also the product trihydrate has improved stability.

The attached drawing is a flow sheet illustrating one preferred procedure for carrying out this modification of the invention batchwise. The apparatus shown in the drawing is indicated diagrammatically and is not to scale. For the sake of simplicity and clearness much of the auxiliary equipment such as intermediate storage tanks, machinery for handling solid reactants and products, control devices, etc., is not shown.

Referring to the drawing, caustic soda solution, for example of about 10% NaOH concentration, and water, preferably deionized water, are charged by lines 1 and 2, and 3, respectively, to the precipitator 4 which is provided with a stirrer 5 operated by motor 6. Borax which may be in solid form or in solution, preferably concentrated solution, in water, is fed to the precipitator at 7. The heat released by the reaction of the borax with the caustic to form sodium metaborate causes the temperature to rise, the increase being dependent upon the concentration of the reactants in the solution. Generally the concentration is controlled so that the temperature rises to about 130° to 150° F. and solid sodium metasilicate and Epsom salt or magnesium chloride are fed to the warm metaborate solution, suitably by screw conveyors represented by lines 8 and 9, and 10 and 11, respectively, although manual addition is feasible or these chemicals can be fed in the form of aqueous solutions. The solution is agitated for a suitable time, for example, about 1 to 2 hours, to effect precipitation of magnesium silicate. The mixture is then withdrawn by line 12, and pumped by pump 13 and line 14 to filter 15 in which the precipitated magnesium silicate is removed. The removal of the precipitate has also been successfully carried out by allowing the precipitate to settle by standing overnight at room temperature and then decanting the solution from the precipitated magnesium silicate.

Magnesium silicate is also precipitated in the hydrogen peroxide solution according to the preferred form of the invention illustrated in the drawing although this step can be omitted but usually only at some sacrifice. The hydrogen peroxide, advantageously as an aqueous solution of about 30 to 50% concentration, is charged by line 16 to precipitator 17. Sodium metasilicate and Epsom salt are then added by screw conveyors 8 and 18, and 10 and 19, or corresponding pipe lines if these chemicals are being supplied in solution. A small amount of caustic soda solution is then fed in by lines 1 and 20 to raise the pH to the point at which precipitation of magnesium silicate takes place. The mixture is agitated by stirrer 21 operated by motor 22 to insure thorough contact of the solution with the precipitate, and then withdrawn by line 23 and pumped by pump 24 and line 25 to filter 26, or the precipitate is removed by settling and decantation of the solution as described in connection with the treatment of the sodium borate solution.

The pretreated hydrogen peroxide solution is fed by line 27 to reactor 28 into which the pretreated sodium metaborate solution from filter 15 is also fed by line 29. Sodium perborate trihydrate seed, preferably in the form of a slurry from a previous batch, is then added to reactor 28 by line 30. During reaction and crystallization of the sodium perborate trihydrate the temperature is maintained at 122±10° F. by means of heating coil 31 and vacuum vaporization of water, the mixture being kept agitated by motor driven stirrers 32 and 33. After about 4 to 7 hours a thick slurry of sodium perborate trihydrate crystals (melting point 83°–84° C.) is obtained. This slurry is drawn off through line 34 to slurry storage tank 35 provided with stirrer 36 driven by motor 37.

The sodium perborate trihydrate slurry is fed by line 38, pump 39, and line 40 to a continuous centrifuge 41 in which the trihydrate crystals are separated from the mother liquor, washed with wash liquid, for example dilute isopropyl alcohol solution, from line 42, and withdrawn by line 43 as product for drying or other processing prior to shipment and/or use.

The mother liquor removed by line 44 to tank 45 is returned to reactor 28 by line 46, pump 47, and line 48 after withdrawing a portion by line 48a to prevent build-up of impurities in the system. The mother liquor withdrawn by line 48a can be treated in various ways to recover its sodium perborate content. One convenient method is by cooling to about 30° to 35° F. in crystallizer 49 to precipitate the sodium perborate as the tetrahydrate which can be filtered from the resulting second mother liquor or separated therefrom in centrifuge 50. The tetrahydrate recovered constitutes a valuable by-product of the process which can be recovered at 51 and used as such but more preferably is dissolved, in tank 52, in the sodium borate solution from filter 15 supplied by lines 29 and 53 and returned by pump 54 and lines 55 and 29 to reactor 28 where it is recrystallized as the desired trihydrate.

In any case the composition of the combined feed and recycle streams fed to reactor 28 is adjusted so as to provide a sodium metaborate to hydrogen peroxide mole ratio of about 1:1 and a ratio of about 20 moles of water per mole of hydrogen peroxide exclusive of the water added for vaporization cooling. The amount of magnesium silicate which it has been found desirable to precipitate in precipitators 4 and 17, is about 0.1 to 1, preferably about 0.2 to 0.5, moles per mole of sodium borate and hydrogen peroxide, respectively.

When operating according to this preferred method with a recycle of half of the first mother liquor to the reactor, the yield of sodium perborate trihydrate is about 96% based on make-up sodium borate (borax) and about 95% on the make-up hydrogen peroxide where the loss of peroxide by decomposition is only 3.6%.

The sodium perborate trihydrate thus obtained has remarkable stability in storage both at ordinary temperatures and at elevated temperatures. Thus in 21 days' storage at room temperature exposed to an atmosphere of 100% humidity or in three months' storage at 37° C. in loosely capped containers, there was no detectable loss of active oxygen. In one month's storage exposed to the atmosphere at 50° C. the loss of active oxygen was only 2.6%. This may be contrasted with the results obtained with sodium perborate trihydrate manufactured in the same way except that the feed solutions were not treated with a gelatinous inorganic precipitate but instead stabilizers were employed. With 0.14 gram of ethylene diamine tetraacetic acid tetrasodium salt ("Versene Fe-3") per mole of peroxide in the reaction, the loss of active oxygen was 6.1% in 23 days' storage of the sodium perborate trihydrate at 37° C. When the same amount of "Versene Fe-3" was used with 0.25 mole percent of magnesium silicate added at the end of the reaction, the sodium perborate trihydrate was partly liquefied in 18 days at 50° C. and lost 15% of its active oxygen in one month at that temperature.

The mechanism whereby the magnesium silicate precipitate brings about these improved results has not been completely elucidated but it is plausible to assume that due to its gelatinous character it removes deleterious materials present in very small amounts. While if this gelatinous material is allowed to remain in the reaction mixture, it may serve as nuclei promoting crystallization of the perborate in the less desirable tetrahydrate form which is known to crystallize more rapidly than the trihydrate and to be less stable, or otherwise interfere with production of the desired stable trihydrate. Whatever the explanation, tests have shown that by precipitating a gelatinous inorganic material in the sodium borate feed solution and then removing the precipitate, a very remarkable improvement in the process and the quality of the trihydrate product is obtained.

As previously indicated the process of the invention is not limited to the use of gelatinous magnesium silicate as in the foregoing illustrative example but can be successfully carried out with other flocculent inorganic precipitates. Among those which can be used instead of magnesium silicate are, for example, the gelatinous hydroxides of which magnesium and aluminum hydroxide are especially effective. Thus, for instance, by omitting the sodium metasilicate feed supplied by lines 8, 9 and 18 in the modification shown in the drawing and adjusting the supply of sodium hydroxide fed by lines 1 and 20 to provide sufficient for reaction with the Epsom salt to precipitate magnesium hydroxide as a voluminous gelatinous solid, good results can be obtained in the new process. Alternatively aluminum sulfate can be substituted for the Epsom salt in the process. Good results have been obtained by using flocculent precipitates of calcium or aluminum phosphate in the first step of the process by adding calcium chloride or aluminum sulfate and sodium phosphate in place of the sodium metasilicate and Epsom salt.

While the best results have been obtained by forming the gelatinous inorganic precipitate in the sodium borate solution directly, it is also possible to form the precipitate separately and disperse it in the sodium borate and hydrogen peroxide solutions although this is generally less convenient. Still other variations in the new process are possible. Thus, for example, the precipitate can be mixed with preformed sodium borate instead of with the mixture in which it is being produced from borax as described in the previous example. Continuous operation can be used instead of the batch method shown in the drawing.

The invention is, of course, not limited to the specific reaction condition described for the second step of the process in which sodium perborate trihydrate is produced, since any suitable method for carrying out this step can be employed without departing from the invention. Instead of using hydrogen peroxide for the reaction, sodium peroxide or appropriate mixtures of sodium peroxide, sodium hydroxide and hydrogen peroxide may be used. It will thus be seen that the process is capable of considerable variation not only with respect to the compounds which can be employed but also in regard to the conditions under which they are used.

I claim as my invention:

1. A process for producing sodium perborate trihydrate which comprises forming a gelatinous magnesium silicate in an aqueous solution of sodium metaborate by reaction of added soluble magnesium compound with added soluble silicate for a period of the order of about 1 to about 2 hours, removing the magnesium silicate from the solution, adding aqueous hydrogen peroxide to the sodium metaborate solution and crystallizing sodium perborate trihydrate from the mixture at 40° to 60° C.

2. A process in accordance with claim 1, wherein magnesium silicate is precipitated in, and removed from, the hydrogen peroxide solution before it is added to the sodium borate.

3. A process which comprises adding reactants which react together to form a gelatinous inorganic precipitate to a sodium metaborate solution, removing the thus formed precipitate from the solution, admixing a source of hydrogen peroxide with the precipitate-free solution in proportions such that the mole ratio of sodium metaborate to hydrogen peroxide is about 1:1 under conditions at which sodium perborate trihydrate crystallizes therefrom, precipitating sodium perborate trihydrate from the mixture at about 122°±10° F., cooling at least a part of the remaining solution to a temperature at which sodium perborate tetrahydrate crystallizes therefrom and dissolving said tetrahydrate in said precipitate-free sodium borate before contacting the latter with said source of hydrogen peroxide.

References Cited in the file of this patent

UNITED STATES PATENTS

| | | |
|---|---|---|
| 1,669,997 | Noll | May 15, 1928 |
| 1,722,871 | Weber et al. | July 30, 1929 |
| 1,812,347 | Kuhnert | June 30, 1931 |
| 2,065,744 | Reichert | Dec. 29, 1936 |
| 2,947,602 | Youngman et al. | Aug. 2, 1960 |

FOREIGN PATENTS

| | | |
|---|---|---|
| 204,279 | Germany | Nov. 16, 1908 |
| 548,432 | Germany | Apr. 12, 1932 |